United States Patent
Arimura

(10) Patent No.: US 8,034,507 B2
(45) Date of Patent: Oct. 11, 2011

(54) DIRECT-METHANOL FUEL CELL

(75) Inventor: Tomoaki Arimura, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/850,908

(22) Filed: Aug. 5, 2010

(65) Prior Publication Data

US 2011/0123895 A1   May 26, 2011

(30) Foreign Application Priority Data

Nov. 25, 2009  (JP) ................. 2009-267820

(51) Int. Cl.
*H01M 8/24* (2006.01)
*H01M 8/04* (2006.01)

(52) U.S. Cl. ...................... 429/457; 429/514

(58) Field of Classification Search .......... 429/457, 429/512, 513, 514, 518
See application file for complete search history.

(56) References Cited

U.S. PATENT DOCUMENTS

| | | | |
|---|---|---|---|
| 3,847,672 A | 11/1974 | Trocciola et al. |
| 6,099,983 A | 8/2000 | Nakagaki et al. |
| 6,878,473 B2 | 4/2005 | Yamauchi et al. |
| 7,094,485 B2 | 8/2006 | Takashita et al. |
| 7,276,303 B2 | 10/2007 | Miyamoto et al. |
| 7,297,426 B2 | 11/2007 | Sakai et al. |
| 7,374,832 B2 | 5/2008 | Miyamoto et al. |
| 7,563,524 B2 | 7/2009 | Matsuoka et al. |
| 7,569,295 B2 | 8/2009 | Ninomiya et al. |
| 7,582,376 B2 | 9/2009 | Arimura |
| 7,585,335 B2 | 9/2009 | Arimura |
| 7,632,598 B2 | 12/2009 | Arimura |
| 7,674,548 B2 | 3/2010 | Arimura |
| 7,754,363 B2 | 7/2010 | Takashita et al. |
| 7,785,745 B2 | 8/2010 | Oto et al. |
| 7,892,701 B2 | 2/2011 | Arimura |
| 2006/0068238 A1 | 3/2006 | Arimura |
| 2006/0177721 A1 | 8/2006 | Arimura |
| 2007/0141448 A1 | 6/2007 | Ueda et al. |
| 2010/0081031 A1 | 4/2010 | Arimura |
| 2010/0297536 A1 | 11/2010 | Arimura |
| 2010/0310970 A1 | 12/2010 | Arimura |

FOREIGN PATENT DOCUMENTS

| | | |
|---|---|---|
| JP | 4094061 | 3/1992 |
| JP | 2000-067874 | 3/2000 |
| JP | 2006-185901 | 7/2006 |
| JP | 2006294294 | 10/2006 |
| JP | 2007115619 | 5/2007 |
| JP | 2007131699 | 5/2007 |
| JP | 2007311057 | 11/2007 |

OTHER PUBLICATIONS

Japanese Patent Application No. 2009-267820; Notification of Reasons for Rejection; Mailed Nov. 9, 2010 (English translation).

*Primary Examiner* — Jerry A Lorengo
*Assistant Examiner* — Carlos Barcena
(74) *Attorney, Agent, or Firm* — Blakely, Sokoloff, Taylor & Zafman LLP

(57) ABSTRACT

According to one embodiment, a direct-methanol fuel cell includes an anode into which an aqueous methanol solution is introduced as fuel, a cathode into which an oxidizing agent is introduced, an electrolyte membrane interposed between the anode and the cathode, an anode separator which is disposed on the anode side and includes a fuel passage formed on a surface facing the anode, and a cathode separator which is disposed in the cathode side and includes an oxidizing gas passage formed on a surface facing the cathode. At least the cathode separator is provided with a coating film including a macromolecular polymer having a water-repellent functional group and an ionic functional group, the coating film being formed on at least an inside surface of the oxidizing gas passage.

2 Claims, 5 Drawing Sheets

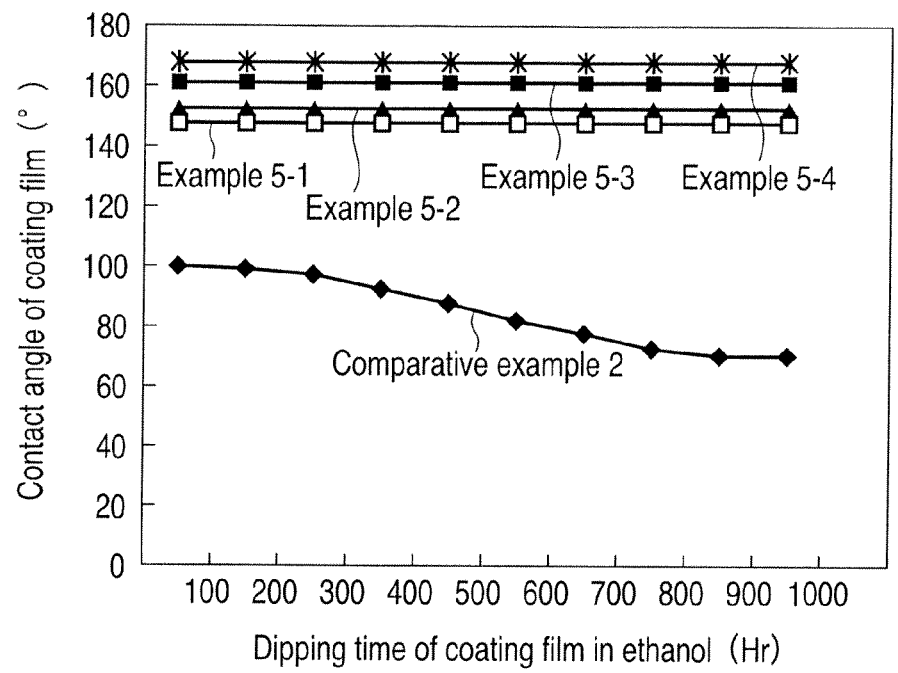
F I G. 5
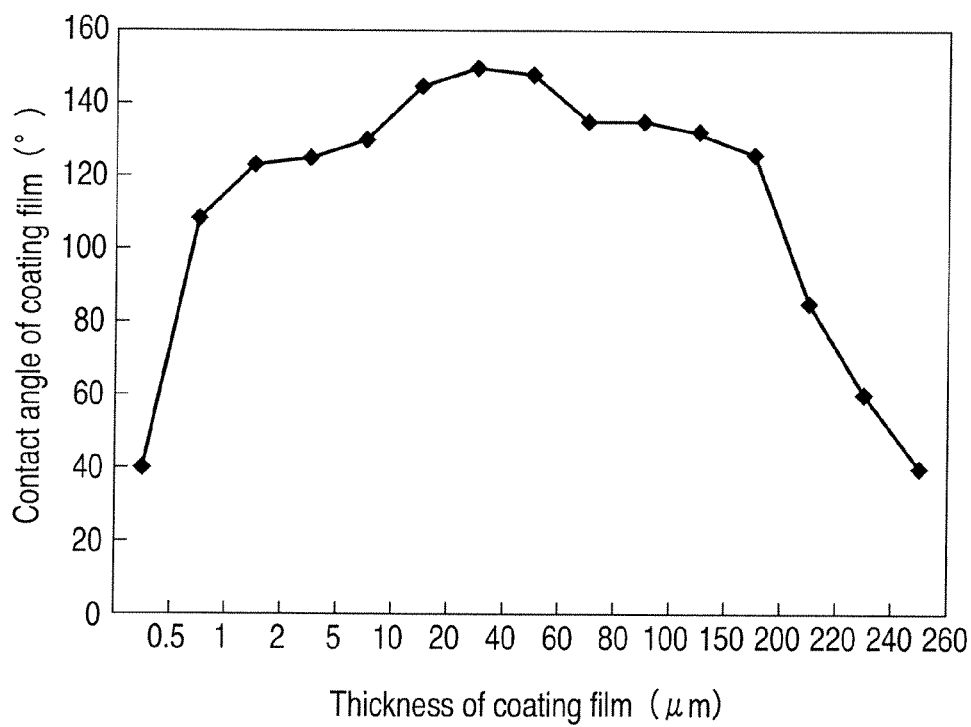
F I G. 6

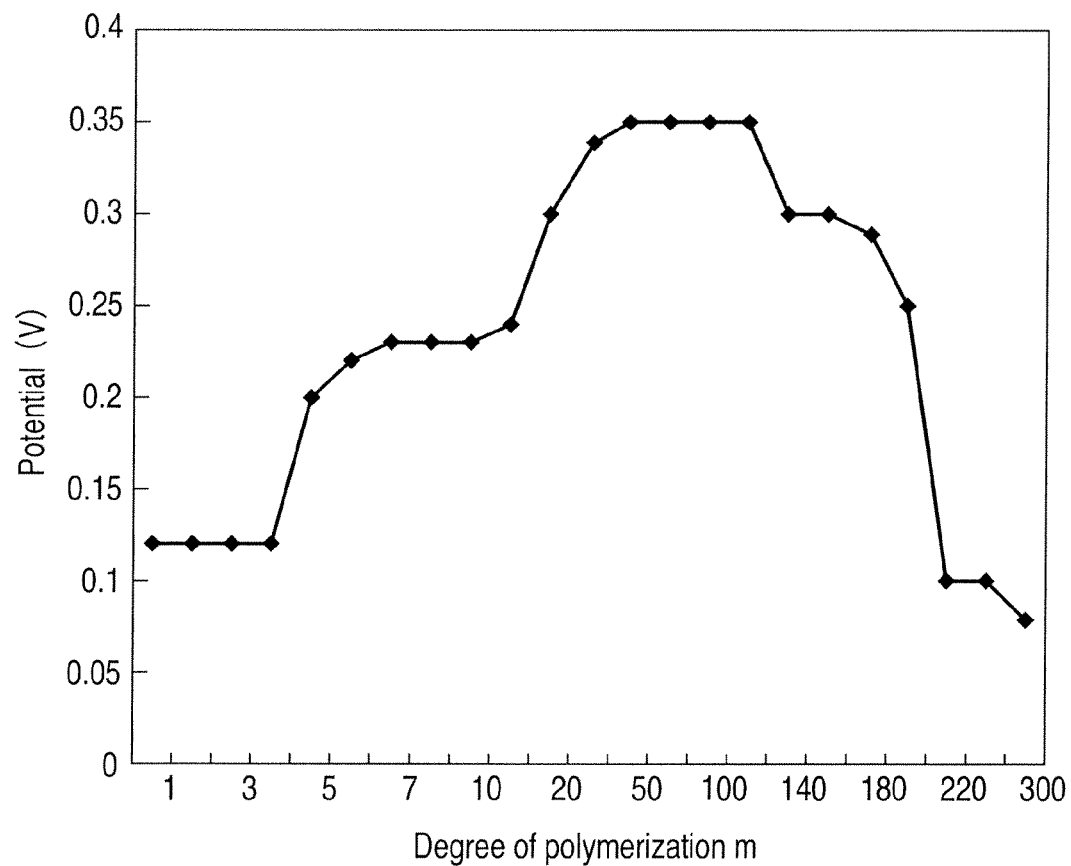
F I G. 7

US 8,034,507 B2

DIRECT-METHANOL FUEL CELL

CROSS-REFERENCE TO RELATED APPLICATIONS

This application is based upon and claims the benefit of priority from Japanese Patent Application No. 2009-267820, filed Nov. 25, 2009; the entire contents of which are incorporated herein by reference.

FIELD

Embodiments described herein relate generally to a direct-methanol fuel cell.

BACKGROUND

A direct-methanol fuel cell comprises an anode into which an aqueous methanol solution is introduced as fuel, a cathode into which an oxidizing gas is introduced, an electrolyte membrane interposed between these electrodes, a fuel separator which is disposed in the anode and comprises a fuel passage, and a cathode separator which is disposed in the cathode and comprises an oxidizing gas passage. As each of these separators, a carbon plate or SUS plate is currently used.

In such a direct-methanol fuel cell, droplets of water-methanol condense primarily on the inside surface of the oxidizing gas passage of the cathode separator in the process of generating electricity. The droplets of liquid clog the oxidizing gas passage, that is, cause so-called flooding, which hinders the flow of the oxidizing gas such as air. As a result, the reduction reaction of the cathode is hindered, degrading the output and reliability of the fuel cell.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 5 is a graph showing the relation between the dipping time of methanol and the contact angle of a coating film in Examples 5-1 to 5-4 and Comparative Example 2;

FIG. 6 is a graph showing the relation between the thickness of a polymer coating film of a prepolymer obtained in Preparation Example 1 and the contact angle of the coating film;

FIG. 7 is a graph showing a variation in the voltage of an evaluation unit cell in the case of using an anode separator and a cathode separator in which a coating film of a polymer is formed on the inside surface of a passage, the polymer being obtained by varying the degree m of polymerization of a first monomer (1) between 1 and 280 when the degree n of polymerization of a second monomer (2) is 50 in Example 1.

DETAILED DESCRIPTION

Various embodiments will be described hereinafter with reference to the accompanying drawings. In general, according to one embodiment, a direct-methanol fuel cell includes an anode into which an aqueous methanol solution is introduced as fuel, a cathode into which an oxidizing gas is introduced, an electrolyte membrane interposed between the anode and the cathode, an anode separator which is disposed on the anode side and comprises a fuel passage formed on a surface facing the anode, and a cathode separator which is disposed on the cathode side and comprises an oxidizing gas passage formed on a surface facing the cathode, wherein at least the cathode separator selected from the cathode and anode separators is provided with a coating film including a macromolecular polymer having a water-repellent functional group and an ionic functional group, the coating film being formed on at least an inside surface of the oxidizing gas passage in the cathode separator.

Figure 1:
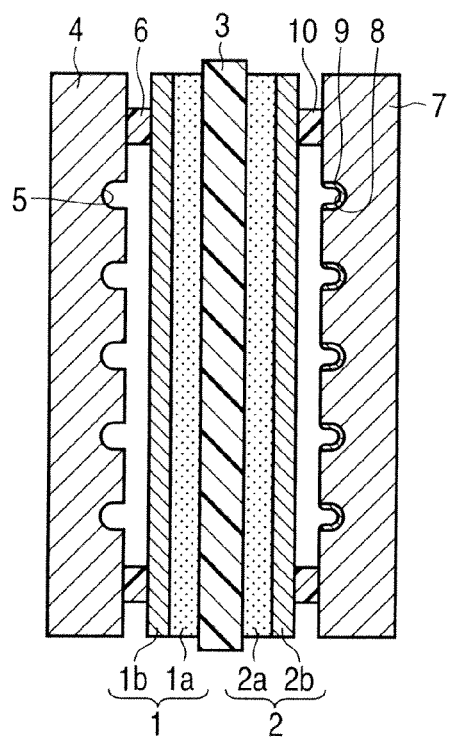
FIG. 1 is a sectional view showing a direct-methanol fuel cell according to an embodiment.

A specific direct-methanol fuel cell has a structure shown in FIG. 1.

In the drawings, "1" represents an anode into which an aqueous methanol solution is introduced as fuel. "2" represents a cathode into which an oxidizing gas is introduced. An electrolyte membrane 3 is interposed between these anode 1 and cathode 2. The anode 1 comprises a catalyst layer 1a which is in contact with the electrolyte membrane 3 and a diffusion layer 1b such as carbon paper laminated on the catalyst layer 1a. The cathode 2 comprises a catalyst layer 2a which is in contact with the electrolyte membrane 3 and a diffusion layer 2b such as carbon paper laminated on the catalyst layer 2a.

An anode separator 4 is disposed on the anode 1 side and, for example, a meandering fuel passage 5 is formed on the surface facing the anode 1. The fuel passage 5 comprises a fuel supply port (not shown) formed at one end thereof so as to penetrate through the separator 4 and a fuel discharge port (not shown) formed at the other end so as to penetrate through the separator 4. A seal material 6 is disposed between the anode 1 and the separator 4 so as to surround the fuel passage 5.

A cathode separator 7 is disposed on the cathode 2 side and, for example, a meandering oxidizing gas passage 8 is formed on the surface facing the cathode 2. The oxidizing gas passage 8 comprises an oxidizing gas supply port (not shown) formed at one end thereof so as to penetrate through the separator 7 and an oxidizing gas discharge port (not shown) formed at the other end so as to penetrate through the separator 7. A coating film 9 including a macromolecular polymer having a water-repellent functional group and an ionic functional group is formed on at least the inside surface of the oxidizing gas passage 8. A frame seal material 10 is disposed between the cathode 2 and the separator 7 so as to surround the oxidizing gas passage 8.

The anode separator 4, anode 1, electrolyte membrane 3, cathode 2 and cathode separator 7 are secured to each other by bolts and nuts (not shown).

In a preferable embodiment, the macromolecular polymer contained in the coating film is a copolymer of a first monomer in which a water-repellent functional group and a cyclic boron functional group are bonded to its principal chain and a second monomer in which an ionic functional group and a cyclic boron ether functional group are bonded to its principal chain.

In more preferable embodiment, the above macromolecular polymer is a block copolymer represented by the following formula (I).

Figure 2:
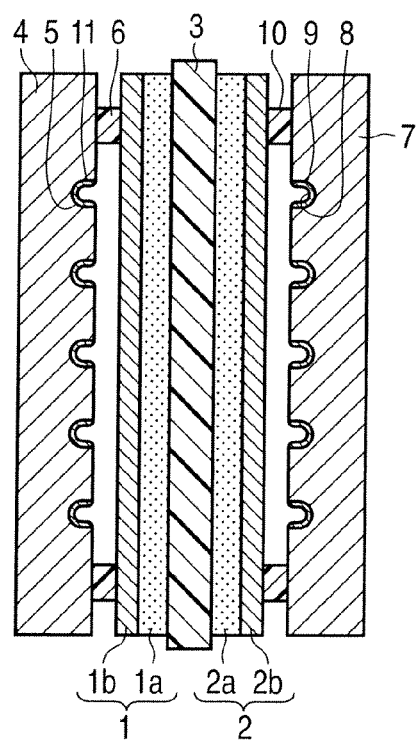
FIG. 2 is a sectional view showing a modification of the direct-methanol fuel cell according to the embodiment.

In this case, the coating film including a macromolecular polymer having a water-repellent functional group and an ionic functional group is not limited in use to the case where it is formed on at least the inside surface of the oxidizing gas passage in the cathode separator as shown in FIG. 1. As shown in, for example, FIG. 2, a coating film 11 including a macromolecular polymer having a water-repellent functional group and an ionic functional group may be formed on at least the inside surface of the fuel passage 5 in the anode separator 4.

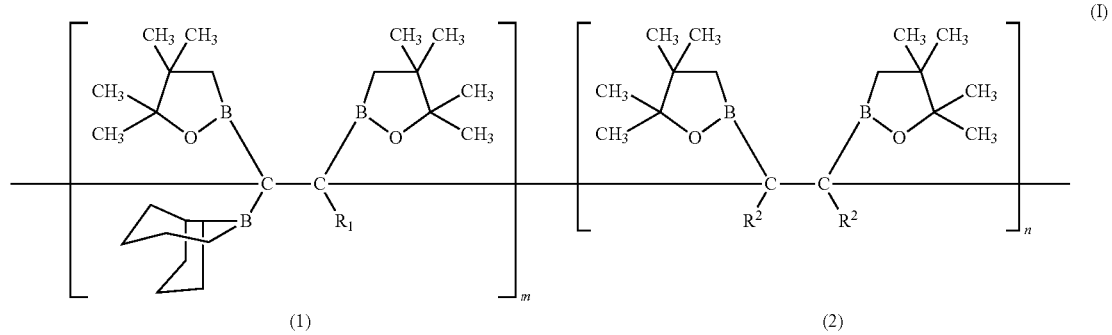

where $R^1$ represents an aliphatic fluorocarbon having 2 to 6 carbon atoms or an organic silicon compound having a silanol skeleton, $R^2$ represents N,N,N',N'-bis(pentamethylene)uronium hexafluorophosphate represented by the following structural formula (A) or N,N,N',N'-bis(tetramethylene)uronium hexafluorophosphate represented by the following structural formula (B), and m and n represent the degrees of polymerization of the first and second monomers (1 and 2 in the formula (I)) and are in the range of 5 to 220 and 30 to 260, respectively.

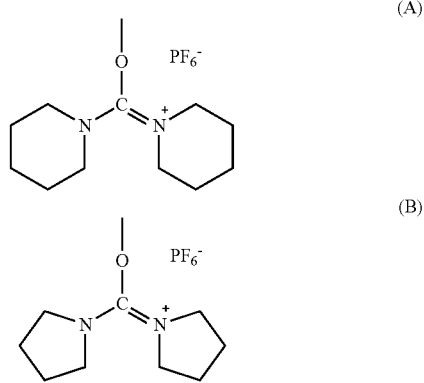

Examples of the aliphatic fluorocarbon having 2 to 6 carbon atoms which is $R^1$ in the formula (I) include $CF_2CF_2CF_3$. Examples of the organic silicon compound having a silanol skeleton which is $R^1$ in the formula (I) include $CH_2OSi(CH_2)_2 Si(CH_3)_3$.

The degree m of polymerization of the first monomer (1) in the formula (I) is preferably 15 to 140.

The degree n of polymerization of the second monomer (2) in the formula (I) is preferably 130 to 230.

The coating film preferably has, for example, a thickness of 1 to 200 μm, because the coating film is obtained water repellency enough to repel condensed droplets of liquid and imparted sufficient ionizationability to the droplets.

Also, the coating film may be formed not only on the inside surface of the oxidizing gas passage but also on the entire surface of the cathode separator 7 including the passage. Similarly, when the coating film is formed on the inside surface of the fuel passage of the anode separator, it may be formed on the entire surface of the anode separator including the passage.

According to the embodiment explained above, the coating film including a macromolecular polymer having a water-repellent functional group and an ionic functional group is formed on at least the inside surface of the oxidizing gas passage in the cathode separator, thereby making it possible to suppress the clogging by droplets of liquid (flooding) in the oxidizing gas passage of the cathode separator.

Namely, droplets produced by the condensation of water-methanol in the oxidizing gas passage of the cathode separator are slightly ionized (mainly, negatively ionized). The macromolecular polymer contained in the above coating film has a water-repellent functional group and an ionic functional group. For this reason, when droplets condense in the oxidizing gas passage, these droplets are repelled by water-repellent portions where the water-repellent functional group is present and the negatively ionized droplets are attracted to positively charged ionizing portions where the ionic functional group is present. The fluidity of the droplets can be promoted by repeating the operations of repelling the droplets at the water-repellent portions and attracting the negatively ionized droplets to the ionizing portions. As a result, droplets produced at a bent passage portion can also be made to flow easily by the force of the introduced oxidizing gas to be discharged from the passage efficiently. Therefore, a direct-methanol fuel cell can be provided which suppresses liquid droplet clogging (flooding) of the oxidizing gas passage of the cathode separator and in which the reduction reaction of the cathode is promoted to attain an improvement in energy output.

In addition, the above-mentioned coating film including the copolymer of the first monomer and the second monomer as a macromolecular polymer can be improved in the ability to repel droplets of liquid at the water-repellent portions where the first monomer is present. For this reason, droplets produced at a bent passage portion can also be made to flow easily by the force of the introduced oxidizing gas to be discharged from the passage more efficiently.

Further, the above-mentioned coating film containing the block copolymer as a macromolecular polymer represented by the above formula (I) can be improved in the ability to repel droplets at water-repellent portions where the first monomer (1) in the formula (I) is present and also in the ability to attract negatively ionized droplets repelled at the water-repellent portions to the ionizing portions where the second monomer (2) in the formula (I) is present. As a result, the fluidity of the droplets can be further improved and therefore, droplets produced at a bent passage portion can also be made to flow easily by the force of the introduced oxidizing gas to be discharged from the passage more efficiently.

EXAMPLES

The present invention will be explained in more detail by way of examples. In these examples, all designations of parts indicate parts by weight, unless otherwise noted.

Preparation Example 1 of a Prepolymer

A round-bottomed reactor equipped with an overhead stirrer and a Dimroth condenser tube was charged with 30 parts of N,N-dimethylformamide. This reactor was also charged with 50 parts of cis-1,2-bis(4,4,5,5-tetramethyl-1,3,2-dioxaboran-2-yl)-9-borabicyclo[3,3,1]nonane-hexafluoropropylene-ethylene monomer (called HFP) (first monomer) and 50 parts of cis-1,2-bis(4,4,5,5-tetramethyl-1,3,2-dioxaboran-2-yl)-bis[N,N,N',N'-bis(pentamethylene)uronium hexafluorophosphate]-ethylene monomer (called PUH) (second monomer) to dissolve. In succession, 0.5 parts of azobisisobutyronitrile was added to the solution in the reactor. The solution in the reactor was stirred for 3 minutes while heating the solution to 60° C. in an oil bath. Then, 0.5 parts of benzophenone was added to the reaction solution. After that, the solution was further stirred for 5 minutes to prepare a prepolymer.

Preparation Example 2 of a Prepolymer

A prepolymer was prepared in the same manner as in the above Preparation Example 1 except that 50 parts of HFP was used as the first monomer and 50 parts of cis-1,2-bis(4,4,5,5-tetramethyl-1,3,2-dioxaboran-2-yl)-bis[N,N,N',N'-bis(tetramethylene)uronium hexafluorophosphate]-ethylene monomer (called TUH) was used as the second monomer.

Preparation Example 3 of a Prepolymer

A prepolymer was prepared in the same manner as in the above Preparation Example 1 except that 50 parts of cis-1,2-bis(4,4,5,5-tetramethyl-1,3,2-dioxaboran-2-yl)-9-borabicyclo[3,3,1]nonane-trimethylsilyloxydimethylsilyloxymethyl-ethylene monomer (called TMS) was used as the first monomer and 50 parts of PUH was used as the second monomer.

Preparation Example 4 of a Prepolymer

A prepolymer was prepared in the same manner as in the above Preparation Example 1 except that 50 parts of TMS was used as the first monomer and 50 parts of TUH was used as the second monomer.

The prepolymers obtained in Preparation Examples 1 to 4 were respectively irradiated with ultraviolet rays having a wavelength of 250 to 450 nm as will be mentioned later to form a polymer (block copolymer) which was then identified. The results are shown in Table 1 below.

TABLE 1

| | Block copolymer of the formula (I) | | | | | | |
|---|---|---|---|---|---|---|---|
| | First monomer | Degree of polymerization [m] | Second monomer | Degree of polymerization [n] | $^1$H-NMR(ppm) (DMSO-d6) | $^{13}$C-NMR(ppm) (DMSO-d6) | IR(cm$^{-1}$) |
| Preparation Example 1 | HFP | 7 | PUH | 30 | 1.4, 2.3, 3.6, 3.9 4.3, 4.7, 5.2, 5.8, 7.8 | 25, 32, 41, 51, 64, 68, 72, 83, 126, 131, 133, 135, 138, 140, 142, 146, 158 | 890, 952, 1005, 1120 1750, 3040, 3300 |
| Preparation Example 2 | HFP | 20 | TUH | 100 | 1.5, 2.4, 3.7, 4.0 4.3, 4.8, 5.2, 7.8 | 23, 32, 43, 53, 62, 68, 74, 84, 128, 130, 133, 135, 138, 139, 142, 146, 156 | 870, 952, 1010, 1145, 1780, 3050, 3360 |
| Preparation Example 3 | TMS | 100 | PUH | 140 | 1.6, 2.6, 3.8, 4.1, 4.5, 4.9, 5.4, 7.9 | 27, 31, 43, 56, 64, 68, 72, 83, 126, 131, 134, 136, 138, 141, 144, 146, 152 | 874, 965, 1014, 1150 1793, 3065, 3384 |
| Preparation Example 4 | TMS | 200 | TUH | 260 | 1.4, 2.3, 3.6, 3.8, 4.3, 4.7, 5.2, 5.8, 7.8 | 25, 32, 43, 59, 64, 68, 76, 85, 126, 130, 132, 135, 138, 140, 143, 146, 157 | 892, 954, 1012, 1132, 1760, 3060, 3300 |

Example 1

[Production of an Anode]

20 parts of a ruthenium platinate-carrying carbon powder was mixed and dispersed in 80 parts of a 5% perfluoroalkylsulfonic acid polymer (trademark: Nafion, manufactured by Du Pont) solution to prepare a slurry. The obtained slurry was applied to the surface of carbon paper (trade name: TPG-H-120, manufactured by Toray Industries, Inc.) by using a coater such that the amount of ruthenium platinate to be carried was 2 mg/cm$^2$ to produce an anode.

[Production of a Cathode]

30 parts of a platinum-carrying carbon powder was mixed and dispersed in 100 parts of a 5% perfluoroalkylsulfonic acid polymer (trademark: Nafion, manufactured by Du Pont) solution to prepare a slurry. The obtained slurry was applied to the surface of carbon paper (trade name: TPG-H-120, manufactured by Toray Industries, Inc.) by using a coater such that the amount of platinum to be carried was 1 mg/cm$^2$ to produce a cathode.

[Production of Anode and Cathode Separators]

Serpentine passages were formed on two carbon plates by cutting processing respectively. The prepolymer obtained in the above Preparation Example 1 was applied to the inside surface of each passage. Then, each coating film was irradiated with ultraviolet rays having a wavelength of 250 to 450 nm for one minute by using an ultraviolet irradiation device (trade name: ECS-1511U-model, manufactured by Eye Graphics Co., Ltd.) to polymerize the prepolymer, thereby producing an anode separator and a cathode separator in which a polymer coating film was formed on the inside surface of the passage.

[Production of a Membrane Electrode]

The obtained anode and cathode were arranged such that the catalyst layers of the anode and cathode were disposed opposite to each other and a polymer electrolyte membrane (trademark: Nafion 117, manufactured by Du Pont) was disposed between these electrodes. Then, the obtained laminate was subjected to a hot-press to manufacture a membrane electrode having an electrode area of 5 cm$^2$.

[Fabrication of a Unit Cell]

The obtained membrane electrode was sandwiched, via a frame seal material, between the above anode and cathode separators each provided with a surface-treated passage, followed by fastening the laminate with a bolt to produce an evaluation unit cell.

Example 2

An evaluation unit cell was fabricated in the same manner as in Example 1 except that, using the prepolymer obtained in Preparation Example 2 in place of the prepolymer obtained in Preparation Example 1, the prepolymer was applied to the inside surface of the serpentine passages of the two carbon plates and the coating film of the prepolymer was irradiated with ultraviolet rays to produce an anode separator and a cathode separator in which a polymer coating film was formed on the inside surface of the passage.

Example 3

An evaluation unit cell was fabricated in the same manner as in Example 1 except that, using the prepolymer obtained in Preparation Example 3 in place of the prepolymer obtained in Preparation Example 1, the prepolymer was applied to the inside surface of the serpentine passages of the two carbon plates and the coating film of the prepolymer was irradiated with ultraviolet rays to produce an anode separator and a cathode separator in which a polymer coating film was formed on the inside surface of the passage.

Example 4

An evaluation unit cell was fabricated in the same manner as in Example 1 except that, using the prepolymer obtained in Preparation Example 4 in place of the prepolymer obtained in Preparation Example 1, the prepolymer was applied to the inside surface of the serpentine passages of the two carbon plates and the coating film of the prepolymer was irradiated with ultraviolet rays to produce an anode separator and a cathode separator in which a polymer coating film was formed on the inside surface of the passage.

Comparative Example 1

An evaluation unit cell was fabricated in the same manner as in Example 1 except that, using polysiloxane (Shin-Etsu Silicone KE-103, manufactured by Shin-Etsu Chemical Co., Ltd.) in place of the prepolymer obtained in Preparation Example 1, polysiloxane was applied to the inside surface of the serpentine passages of the two carbon plates and the polysiloxane coating film was dried to produce an anode separator and a cathode separator in which a polysiloxane coating film was formed on the inside surface of the passage.

Evaluation of a Unit Cell

Each unit cell obtained in Examples 1 to 4 and Comparative Example 1 was subjected to an evaluation test in which an aqueous 3-wt % methanol solution (fuel) was fed to the anode side of the unit cell at a rate of 5 mL/min and air was fed to the cathode side of the unit cell at a rate of 10 mL/min. The current-voltage characteristic of each unit cell was measured at 50° C. The results are shown in FIG. 3.

Figure 3:
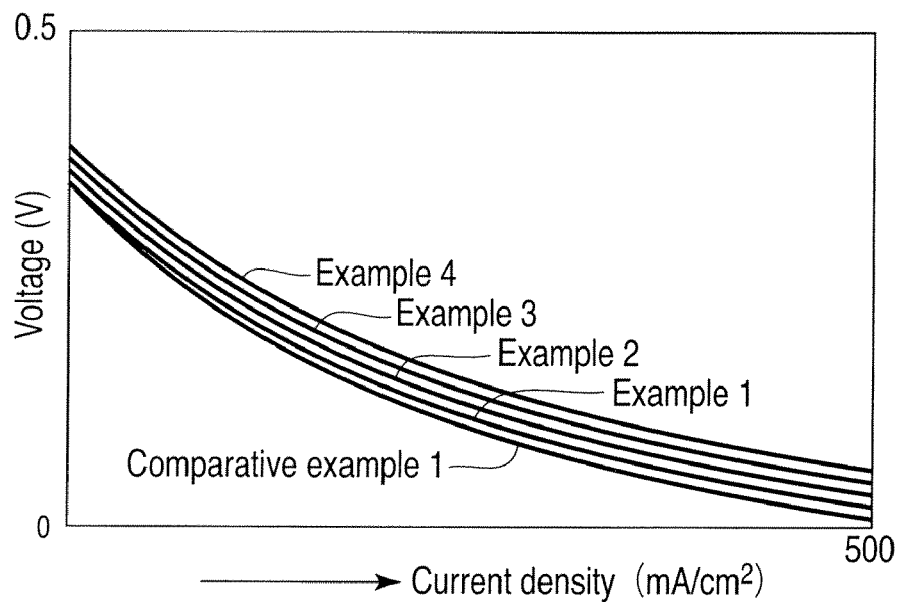
FIG. 3 is a graph showing the current-voltage characteristic curves (at 50° C.) of evaluation unit cells obtained in Examples 1 to 4 and Comparative Example 1.

As is clear from FIG. 3, it is found that the unit cells of Examples 1 to 4 can output a higher voltage than the unit cell of Comparative Example 1.

Also, each unit cell obtained in Examples 1 to 4 and Comparative Example 1 was subjected to an evaluation test in which an aqueous 3-wt % methanol solution (fuel) was fed to the anode side of the unit cell at a rate of 5 mL/min and air was fed to the cathode side of the unit cell at a rate of 10 mL/min. Each unit cell was observed a variation in potential, when the fuel cell was operated at 50° C. for 1000 hours while it maintains a current density of 100 mA/cm$^2$. The results are shown in FIG. 4.

Figure 4:
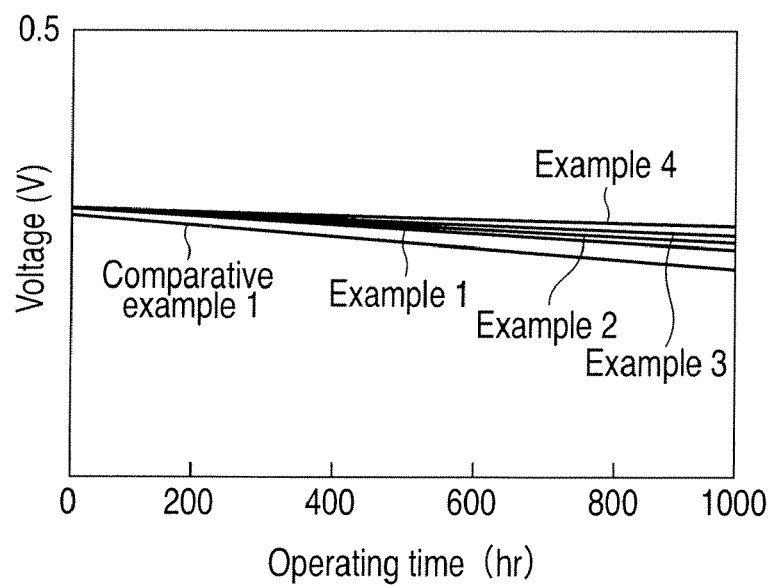
FIG. 4 is a graph showing a variation in the voltage of an evaluation unit cell obtained in each of Examples 1 to 4 and Comparative Example 1 when the cell is operated for a long time while maintaining a constant current density.

As is clear from FIG. 4, it is understood that each unit cell obtained in Examples 1 to 4 has higher potential retentivity than the unit cell of Comparative Example 1 even after a long-term operation, enabling highly reliable generation of electricity.

Examples 5-1 to 5-4, Comparative Example 2

[Evaluation of Methanol Resistance]

Each prepolymer obtained in Preparation Examples 1 to 4 was applied to a carbon plate having external dimensions of 30 mm by 30 mm by 4 mm and the coating film was irradiated with ultraviolet rays having a wavelength of 250 to 450 nm for one minute by using an ultraviolet irradiation device (trade name: ECS-1511U-model, manufactured by Eye Graphics Co., Ltd.) to polymerize the prepolymer, thereby forming a polymer coating film 40 μm in thickness, to manufacture four test specimens (Examples 5-1 to 5-4).

Also, polysiloxane (Shin-Etsu Silicone KE-103, manufactured by Shin-Etsu Chemical Co., Ltd.) was applied to a carbon plate having external dimensions of 30 mm by 30 mm by 4 mm and dried to manufacture a test specimen (Comparative Example 2) having a polysiloxane coating film 40 μm in thickness.

Each obtained test specimen was dipped in 100 cc of methanol to measure the contact angle of the test specimen with an aqueous methanol solution at intervals of 100 hours. The contact angle was found by dripping an aqueous 85-wt % methanol solution on the coating film of the test specimen and by measuring the contact angle with the liquid droplet by a contact angle measuring device (trade name: FTA-1000, manufactured by JASCO International FTA Co., Ltd.). The results are shown in FIG. 5.

As is clear from FIG. 5, it is found that the polymer films (Examples 5-1 to 5-4) which are made of the prepolymers obtained in Preparation Examples 1 to 4 and represented by the formula (I) respectively have a higher contact angle with methanol, that is, a higher water-repellency than the polysiloxane coating film (Comparative Example 2) even after dipped in methanol for a long time, exhibiting excellent methanol resistance.

Example 6

The prepolymer obtained in Preparation Example 1 was applied in different thicknesses to a carbon plate having external dimensions of 30 mm by 30 mm by 4 mm and the obtained coating films having different thicknesses were respectively irradiated with ultraviolet rays having a wavelength of 250 to 450 nm for one minute by using an ultraviolet irradiation device (trade name: ECS-1511U-model, manufactured by Eye Graphics Co., Ltd.) to polymerize the prepolymer, thereby forming polymer coating films having thicknesses of 0.5 to 260 μm, to manufacture test specimens.

The contact angle of the polymer coating film of each test specimen with an aqueous methanol solution was measured. The contact angle was found by dripping an aqueous 85-wt % methanol solution on the polymer coating film of the test specimen and by measuring the contact angle with the liquid droplet by a contact angle measuring device (trade name: FTA-1000, manufactured by Jasco International FTA Co., Ltd.). The results are shown in FIG. 6.

As is clear from FIG. 6, it is found that the polymer film has a high contact angle, that is, a high water-repellency when the thickness of the polymer film is in the range of 1.5 to 160 μm.

Example 7

In Example 1, the potential of the unit cell was measured at a current density of 100 mW/cm² by using an anode separator and a cathode separator in which a coating film of a polymer was formed on the inside surface of each passage, the polymer being obtained by varying the degree m of polymerization of the first monomer (1) between 1 to 280 when the degree n of polymerization of the second monomer (2) was 50. The results are shown in FIG. 7.

As is clear from FIG. 7, it is found that high potentials are observed when the degree m of polymerization of the first monomer is in the range of 10 to 220.

Example 8

In Example 1, the potential of the unit cell was measured at a current density of 100 mW/cm² by using the anode separator and the cathode separator in which a coating film of a polymer was formed on the inside surface of each passage, the polymer being obtained by varying the degree n of polymerization of the second monomer (2) between 1 to 310 when the degree m of polymerization of the first monomer (1) was 50. The results are shown in FIG. 8.

Figure 8:
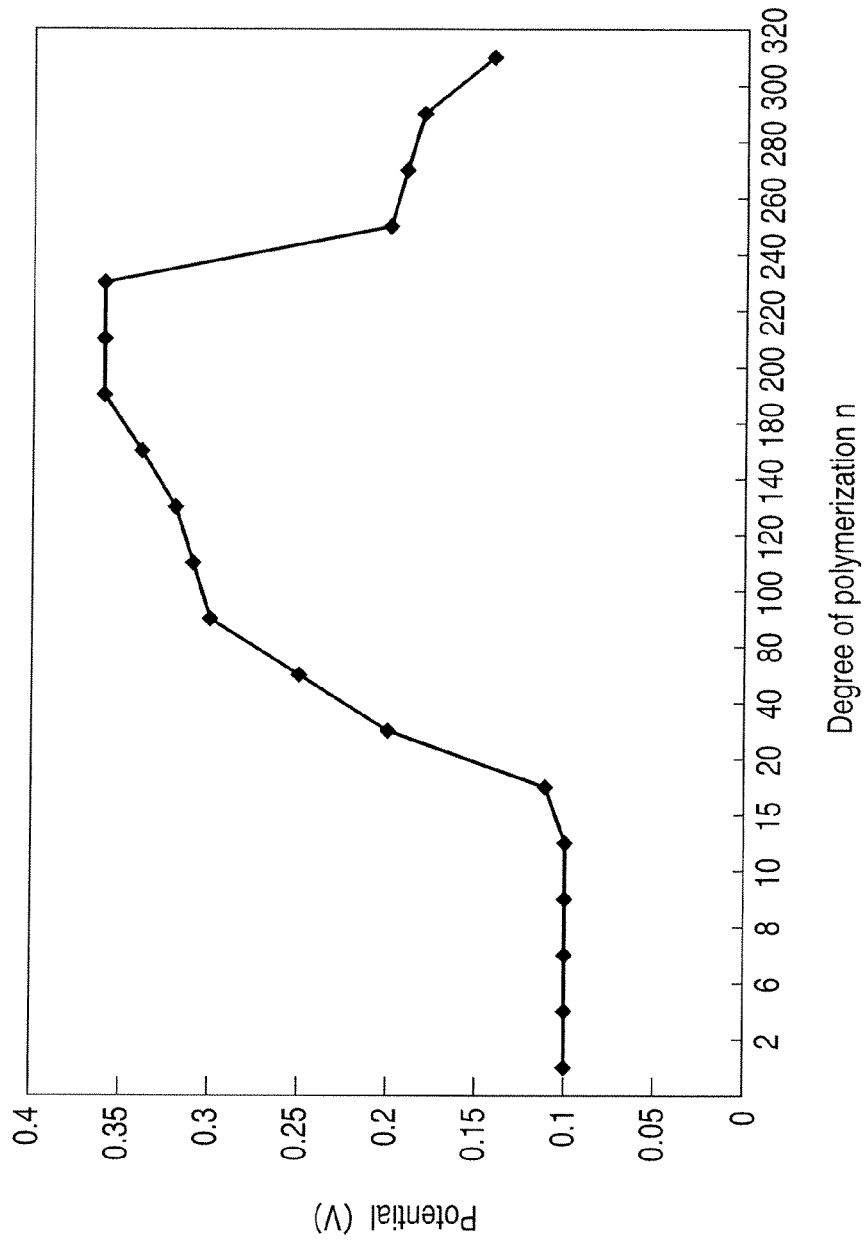
FIG. 8 is a graph showing a variation in the voltage of an evaluation unit cell in the case of using the anode separator and the cathode separator in which a coating film of a polymer is formed on the inside surface of a passage, the polymer being obtained by varying the degree n of polymerization of the second monomer (2) between 1 and 310 when the degree m of polymerization of the first monomer (1) is 50 in Example 1.

As is clear from FIG. 8, it is found that high potentials are observed when the degree n of polymerization of the second monomer is in the range of 30 to 220.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A direct-methanol fuel cell comprising:
   an anode into which an aqueous methanol solution is introduced as fuel;
   a cathode into which an oxidizing gas is introduced;
   an electrolyte membrane interposed between the anode and the cathode;
   an anode separator which is disposed on the anode side and comprises a fuel passage formed on a surface facing the anode; and
   a cathode separator which is disposed in the cathode side and comprises an oxidizing gas passage formed on a surface facing the cathode,
   wherein at least the cathode separator is provided with a coating film including a block copolymer which is represented by the following formula (I) and having a water-repellent functional group and an ionic functional group, the coating film being formed on at least an inside surface of the oxidizing gas passage

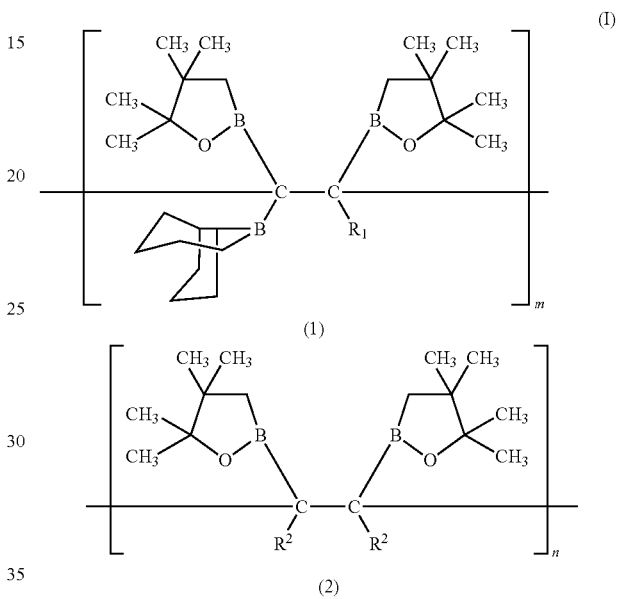

where $R^1$ represents an aliphatic fluorocarbon having 2 to 6 carbon atoms or an organic silicon compound having a silanol skeleton, $R^2$ represents N,N,N',N'-bis(pentamethylene)uronium hexafluorophosphate represented by the following structural formula (A) or N,N,N',N'-bis(tetramethylene)uronium hexafluorophosphate represented by the following structural formula (B), and m and n represent degrees of polymerization of the first and second monomers (1 and 2) and are in the range of 5 to 220 and 30 to 260, respectively:

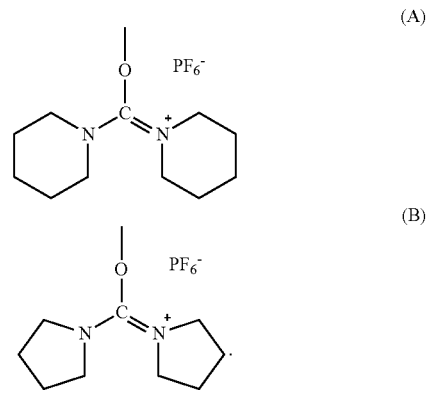

2. The fuel cell of claim 1, wherein the cathode and the anode separators are made of carbon or SUS (stainless steel).

* * * * *